US010163288B2

(12) United States Patent
Troesch et al.

(10) Patent No.: US 10,163,288 B2
(45) Date of Patent: Dec. 25, 2018

(54) ACCESS CONTROL USING PORTABLE ELECTRONIC DEVICES

(71) Applicant: Inventio AG, Hergiswil (CH)

(72) Inventors: Florian Troesch, Zurich (CH); Paul Friedli, Remetschwil (CH)

(73) Assignee: Inventio AG, Hergiswil, NW (CH)

( * ) Notice: Subject to any disclaimer, the term of this patent is extended or adjusted under 35 U.S.C. 154(b) by 0 days.

(21) Appl. No.: 15/532,315

(22) PCT Filed: Dec. 2, 2015

(86) PCT No.: PCT/EP2015/078275

§ 371 (c)(1),
(2) Date: Jun. 1, 2017

(87) PCT Pub. No.: WO2016/087483

PCT Pub. Date: Jun. 9, 2016

(65) Prior Publication Data

US 2017/0270728 A1 Sep. 21, 2017

(30) Foreign Application Priority Data

Dec. 2, 2014 (EP) .................................... 14195829

(51) Int. Cl.
*G05B 19/00* (2006.01)
*G07C 9/00* (2006.01)

(52) U.S. Cl.
CPC .................... *G07C 9/00309* (2013.01); *G07C 2009/00396* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 2001/0029234 | A1 | 10/2001 | Tu et al. | |
| 2002/0180582 | A1* | 12/2002 | Nielsen | G07C 9/00103 340/5.6 |
| 2003/0132282 | A1 | 7/2003 | Workens | |
| 2003/0152207 | A1* | 8/2003 | Ryan | H04M 3/42153 379/201.04 |
| 2004/0147244 | A1 | 7/2004 | Raisanen | |
| 2005/0190053 | A1 | 9/2005 | Dione | |
| 2006/0100779 | A1 | 5/2006 | Vergin | |

(Continued)

FOREIGN PATENT DOCUMENTS

| | | | |
|---|---|---|---|
| CN | 102449667 | A | 5/2012 |
| EP | 1705595 | A2 | 9/2006 |

(Continued)

*Primary Examiner* — Adolf Dsouza
(74) *Attorney, Agent, or Firm* — Baker & Hostetler LLP

(57) ABSTRACT

To control access to a predetermined service or area, a system receives an activation signal indicative of a user's activation of an access code. As a result of receiving the activation signal, the system sends a verification code to a portable electronic device of the user. An access terminal receives the verification code. Access to the predetermined service or area is granted if the verification code is received at the access terminal meeting one of several predetermined conditions. One condition requires that the verification code is provided to the access terminal within a limited validity time.

13 Claims, 17 Drawing Sheets

(56) References Cited

U.S. PATENT DOCUMENTS

| | | | | |
|---|---|---|---|---|
| 2006/0173991 | A1* | 8/2006 | Piikivi | H04L 63/083 709/224 |
| 2007/0025315 | A1 | 2/2007 | Gerstenkorn | |
| 2007/0151809 | A1 | 7/2007 | Tyni et al. | |
| 2008/0108324 | A1* | 5/2008 | Moshir | G06F 21/35 455/411 |
| 2008/0263652 | A1 | 10/2008 | McMurtry et al. | |
| 2008/0313720 | A1* | 12/2008 | Boalt | H04L 63/0838 726/6 |
| 2009/0014254 | A1 | 1/2009 | Finsehi | |
| 2009/0324025 | A1* | 12/2009 | Camp, Jr. | G07C 9/00007 382/124 |
| 2010/0020970 | A1 | 1/2010 | Liu et al. | |
| 2010/0299731 | A1 | 11/2010 | Atkinson | |
| 2011/0105080 | A1* | 5/2011 | Haughn | G06F 21/335 455/411 |
| 2011/0291798 | A1* | 12/2011 | Schibuk | G07B 15/00 340/5.61 |
| 2012/0068818 | A1* | 3/2012 | Mizon | G07C 9/00007 340/5.61 |
| 2012/0211566 | A1 | 8/2012 | Hensel et al. | |
| 2012/0233669 | A1 | 9/2012 | Husemann et al. | |
| 2013/0048435 | A1 | 2/2013 | Finschi | |
| 2013/0210406 | A1 | 8/2013 | Vidal et al. | |
| 2014/0082748 | A1* | 3/2014 | Gomi | G06F 21/33 726/28 |
| 2014/0097238 | A1 | 4/2014 | Ghazizadeh | |
| 2014/0117074 | A1 | 5/2014 | Kim | |
| 2015/0235118 | A1 | 8/2015 | Simske et al. | |
| 2016/0248782 | A1* | 8/2016 | Troesch | G07C 9/00007 |

FOREIGN PATENT DOCUMENTS

| | | | |
|---|---|---|---|
| EP | 2458527 | A2 | 5/2012 |
| FR | 2873217 | A1 | 1/2006 |
| JP | 2005-280882 | A | 10/2005 |
| TW | M353974 | U1 | 4/2009 |
| TW | 2012237784 | A | 9/2012 |
| TW | 201327276 | A | 7/2013 |
| WO | 01/41081 | A2 | 6/2001 |
| WO | 2001/045058 | A1 | 6/2001 |
| WO | 2006/000618 | A2 | 1/2006 |
| WO | 2010/112586 | A1 | 10/2010 |
| WO | 2012/015402 | A1 | 2/2012 |
| WO | 2013/191705 | A1 | 12/2013 |

* cited by examiner

ACCESS CONTROL USING PORTABLE ELECTRONIC DEVICES

CROSS-REFERENCE TO RELATED APPLICATIONS

This application is the national phase application under 35 U.S.C. § 371 claiming the benefit of priority based on International Patent Application No. PCT/EP2015/078275, filed on Dec. 2, 2015, which claims the benefit of priority based on European Patent Application No. 14195829.8, filed on Dec. 2, 2014. The contents of each of these applications are herein incorporated by reference.

FIELD OF THE INVENTION

This disclosure relates generally to systems that require user action before providing service to the user, such as granting access to a restricted area, transporting the user to a destination floor and guiding a user, e.g., through a building. Examples of such systems include access control systems, elevator systems and guidance systems.

BACKGROUND OF THE INVENTION

Access control systems typically require a user to present to the system something that is intended to serve as evidence that the user is authorized to receive access from the system. For example, some systems grant access to a user based on a token (e.g., an identification card or a key fob) in the user's possession. The token can be an RFID (radio-frequency identification) tag or other information-storage device. In other systems, access is granted to a user based on information that the user provides to the system, such as a password. Some systems require multiple items from a user, for example, both a token and a password.

US20110291798A1 describes a system in which an electronic device, such as a smartphone, stores a digitally signed physical access rights file. An individual uses this rights file to gain access to a restricted area only after self-authenticating to the device. A physical access control system receives the rights file, validates it, and determines whether to permit passage through a physical barrier. An access control gateway may transmit an authorization code to the electronic device and the physical barrier system, whereby passage is only permitted if the barrier system subsequently receives the authorization code from the electronic device using near field communications.

Certain elevator systems, in particular those installed in commercial buildings and having several elevator cars that operate in parallel to service individual elevator calls, e.g., in hotels or office buildings, require a user to present to the system something that is intended to serve as evidence that the user is authorized to use the elevator system. For example, in an elevator system having a destination control system, the user presents an RFID card to a floor terminal to automatically call an elevator. An identification code read from the RFID card is used to determine if the user is authorized to use the elevator system and what destination floor is stored for that user.

Such access control systems and elevator systems are already automated to a certain degree to facilitate usability of the systems. Further improvements as to usability could be advantageous, while complying with defined security requirements. This is addressed by at least some of the embodiments covered by the claims.

SUMMARY OF THE INVENTION

Briefly, a system that controls access to certain services or areas, or another access code issuing entity can be configured to provide an access code or information related to such an access code to a portable electronic device of a user. The user then has an access right, i.e., an access code, on the portable electronic device, similar to a (physical key). That "key" (the access code) is not necessarily tied to the portable electronic device so that the access code can be forwarded, e.g., to another portable electronic device. Such forwarding, however, may not be desired in all applications, and may be restricted as described herein. In one embodiment, the access code may be downloaded via a web link contained in an SMS sent to the portable electronic device of the user. As the SMS can be forwarded, the access code can be forwarded as well. For example, a host may send such an SMS to a visitor, whose general-purpose portable electronic device may not have a particular application-specific program module (app).

When the user intends to use the access code, the user activates the access right, e.g., by touching a web link contained in an SMS and displayed on the portable electronic device. Via the request using the web link, the system notes that a verification codes has been requested. Alternatively, the user may also activate the access right by touching a displayed web link contained in an SMS. In response, the system downloads the access code, e.g., in form of an optical code (e.g., bar code, QR code or color code) to the portable electronic device, which the user then presents at an access terminal. In response to such activation, the system sends the verification code to the portable electronic device, which is, for example, identified to the system through its device identifier (e.g., SMS, email, or telephone number).

If forwarding of the access right is to be restricted, the user must, for example, use the same portable electronic device that received the verification code to obtain access to the service or area. Also, if the user needs to perform certain acts in a required sequence, the system determines, for example, if the user first activated the access right at a first location and then presents the verification code at a second location. In an airport situation, for example, the user must first check any luggage and then proceed to the boarding gate.

For additional security, the user's name or passport number may be displayed when the user first uses the access code. Security personnel may then compare the displayed name and/or passport number with the user's physical passport document. If there is a match, the user can proceed by presenting, e.g., the optical code on the portable electronic device to an optical reader.

More particularly, one aspect of the improved technology described herein involves a method of controlling access to a predetermined service or area. An activation signal indicative of a user's activation of an access code is received. As a result of receiving the activation signal, a verification code is sent to a portable electronic device of the user. The verification code is received at an access terminal. Access to the predetermined service or area is granted if the verification code is received at the access terminal meeting one of several predetermined conditions.

Another aspect involves a system having a sensor, an access terminal, a wireless communication network, a database, and a computer-based control unit coupled to the sensor, the access terminal, the wireless communication network, and the database. The control unit includes a processor and a computer-readable storage medium, wherein the computer-readable storage medium includes instructions that cause the processor to read, using the access terminal, an access code from a portable electronic device of a user. As a result of reading the access code form the portable electronic device, the instructions cause the processor to send a verification code to the portable electronic device, and to grant access to the user if the verification code is provided to the access terminal meeting one of several predetermined conditions.

The activation signal may be generated in one of several ways. The activation signal can be generated in response to a code request received from the portable electronic device, wherein the code request is initiated by the user. The activation signal may further be generated in response to the user presenting the access code to the access terminal. The access code may be downloaded to the portable electronic device.

In one embodiment, a second condition requires that the access terminal receives the verification code without having been involved in generating the activation signal. For example, the access terminal receives the verification code after another access terminal was involved in generating the activation signal in response to the user presenting the access code. Further, the access code and the verification code may each be represented as an optical code. Several examples of optical codes, including color codes, are described herein. The optical code can be displayed on a display of the portable electronic device, and the user can conveniently place the portable electronic device close to the system's sensor so that the optical code can be sensed. In that way, the user does not have to manually enter the code.

In certain embodiments, communications with the portable electronic device are based on the device identifier. For example, the access code is sent to the portable electronic device based on the device identifier (e.g., which may be a telephone number). This allows a user to receive the access code independent of the user's location. The device identifier may include a global identifier for a communications system that is external to an access control system. Depending on a particular embodiment, the device identifier includes a telephone number associated with the portable electronic device, an address for a push-notification service, a Bluetooth device address, or an e-mail address for an e-mail account that can be accessed through the portable electronic device. These alternatives provide flexibility regarding adapting the technology for different applications.

In one embodiment, the verification code has a limited validity time. The validity time may be based on an expected time for providing the verification code to the access terminal after receipt by the portable electronic device, or on a security level for an area. The automatic expiration of the verification code reduces the likelihood that the verification code can be forwarded to another person's portable electronic device, and still allow that person to provide the verification code to the access terminal at the access-restricted area. For example, the validity time can be very short, e. g., a few seconds, if the system expects the user to be already at the access terminal. If the security level is relatively low, the validity time may be longer. For example, forwarding the access code may be allowed in connection with a theater performance, but the validity time may set to the remaining time until the performance begins.

In some cases, the portable electronic device is in an unlocked state when the access code is read from the portable electronic device at the access terminal. This requires the user to first unlock the portable electronic device before the access code can be used. As only a legitimate user should be able to unlock the device (e.g., by entering a PIN, or placing a finger one fingerprint reader), and implicit authentication and additional security is provided against illegitimate use of the access code.

To determine if the portable electronic device is unlocked may be checked in various ways. If a communication between the portable electronic device and the access terminal occurs via Bluetooth, a sensor in the access terminal not only verifies the certificate, but also if the portable electronic device is unlocked. If an optical code is used, the communication can only occur when the screen is unlocked and the optical code is visible.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more of optical disks, volatile memory components (such as DRAM or SRAM), or nonvolatile memory components (such as hard drives, Flash RAM or ROM). The computer-readable storage media do not cover pure transitory signals. The methods disclosed herein are not performed solely in the human mind.

BRIEF DESCRIPTION OF THE DRAWINGS

The novel features and method steps characteristic of the improved technology described herein are set out in the claims below. The improved technology itself, however, as well as other features and advantages thereof, are best understood by reference to the detailed description, which follows, when read in conjunction with the accompanying drawings, wherein:

DETAILED DESCRIPTION OF EMBODIMENTS OF THE INVENTION

Figure 1:
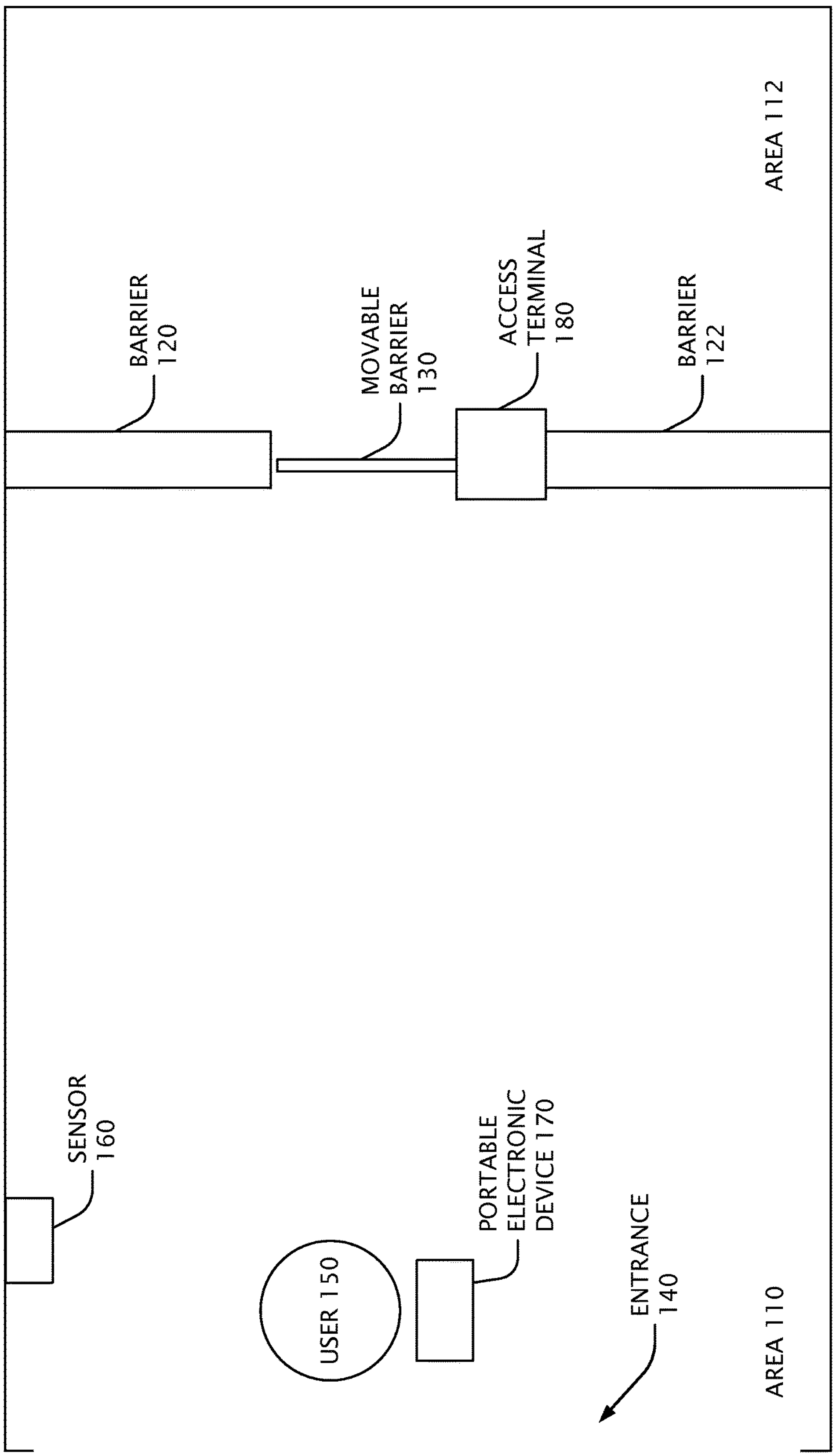
FIG. 1 shows a plan view of an exemplary embodiment of an area using an access control system.

FIG. 1 shows a plan view of an exemplary embodiment of an area using an access control system. One or more of the disclosed technologies can be used in a setting like that of FIG. 1; however, at least some embodiments can also be used in other settings. As used herein, an access control system is not limited to merely controlling access to an access-restricted or secure area; the access control system may also be used to grant access to certain services or in conjunction with calling, and granting access to, an elevator. In some embodiments, the functionalities of controlling access and calling an elevator may be integrated into a system.

FIG. 1 shows an area 110 and an area 112. In this case, access to the area 110 is, at least some of the time, generally not regulated by an access control system. One possible example of the area 110 is a building lobby that is generally accessible to the public from an exterior building door. Access to the area 112, on the other hand, is generally regulated by an access control system. The area 112 is thus considered a “secure”, access-restricted area. One possible example is an office area that is intended to be accessible only by employees and their guests. In the particular case shown in FIG. 1, the area 112 is divided from the area 110 by a set of physical barriers 120, 122 and by a movable barrier 130. In other embodiments, physical and movable barriers are not present—instead, one or more boundaries between the areas 110, 112 are electronically monitored. If a boundary or barrier is crossed by an unauthorized party, the access control system does not open a door or barrier, or the system initiates a countermeasure (e.g., security personnel are notified).

Although not shown in FIG. 1, the area 112 can lead to other building areas (e.g., rooms, staircases. elevators, escalator, storage areas, or other places). In at least some cases, the area 110 includes an entrance 140 through which a user 150 can enter or exit the area 110. FIG. 1 also shows a sensor 160 for detecting a portable electronic device 170 carried by the user 150. Although FIG. 1 depicts the sensor 160 as being in the area 110, it can also be located elsewhere (e.g., in the area 112) and configured to detect activity in the area 110. FIG. 1 also shows an access terminal 180, whose functions will be explained in more detail below. Generally, the access terminal 180 is located at or near a boundary between the areas 110, 112.

FIG. 23 shows a block diagram of an exemplary embodiment of an access control system 200. The system 200 includes a computer-based control unit 210. The control unit 210 comprises, for example, a processor configured to perform one or more method acts described in this application. The processor reads corresponding instructions for the method acts from a memory component.

The control unit 210 is coupled to a first sensor 220, which can correspond to the sensor 160 of FIG. 1. The sensor 220 can communicate with a portable electronic device 170. The portable electronic device 170 is, for example, a smartphone, a mobile telephone, a tablet computer, a smartwatch, or another mobile electronic device. The control unit 210 is also coupled to a second sensor 240.

In one embodiment, the sensors 220, 240 detect the presence of and communicate with the portable device 170 using a radio-based technology, for example, Bluetooth, Bluetooth LE (Bluetooth low energy), Wi-Fi (wireless network), Zigbee, GRPS (General Packet Radio Service), or another technology. In another embodiment, the sensors 220, 240 do not apply such radio-based technology, and may use optical reader technology.

In some embodiments. one of the sensors 220, 240 may be omitted, for example, the second sensor 240 is omitted, and only the first sensor 220 is present, or vice versa. In some systems that have both the first and second sensors, both of the sensors 220, 240 can use the same communication technology (e.g., they both use Bluetooth LE, or optical reader technology).

the control unit 210 is further coupled to an access terminal 250, which can correspond to the access terminal 180 of FIG. 1. In some cases, the sensor 240 and the terminal 250 are integrated into a single unit; in other cases, they are separate components. In particular embodiments, the terminal 250 is a PORT terminal device from the Schindler Group of Switzerland. The control unit 210 is also coupled to a wireless communication network 260 that can communicate with the portable electronic device 170. the wireless communication network 260 comprises. for example: a long-range cellular communication network (e.g., 1G, 2G, 3G, 4G, or another type); a Wi-Fi network; a Bluetooth network; or another type of wireless network. The control unit 210 communicates with the various components of the system 200 through a network 270 (e.g., the internet, a local area network, or another type of network).

In further embodiments, the control unit 210 is also coupled to one or more security system components 280. Such components can include, for example, alarms, cameras, sensors, locks, barriers (e.g., the movable barrier 130), or other components.

In additional embodiments, the control unit 210 is also coupled to an elevator control system 290. The elevator control system 290 can use information provided by the control unit 210 to operate an elevator system. For example, the elevator control system 290 can use such information to enable placing elevator calls (e.g., in a hotel, only a hotel guest may place a call), and to place elevator calls, including destination calls.

Figure 2:
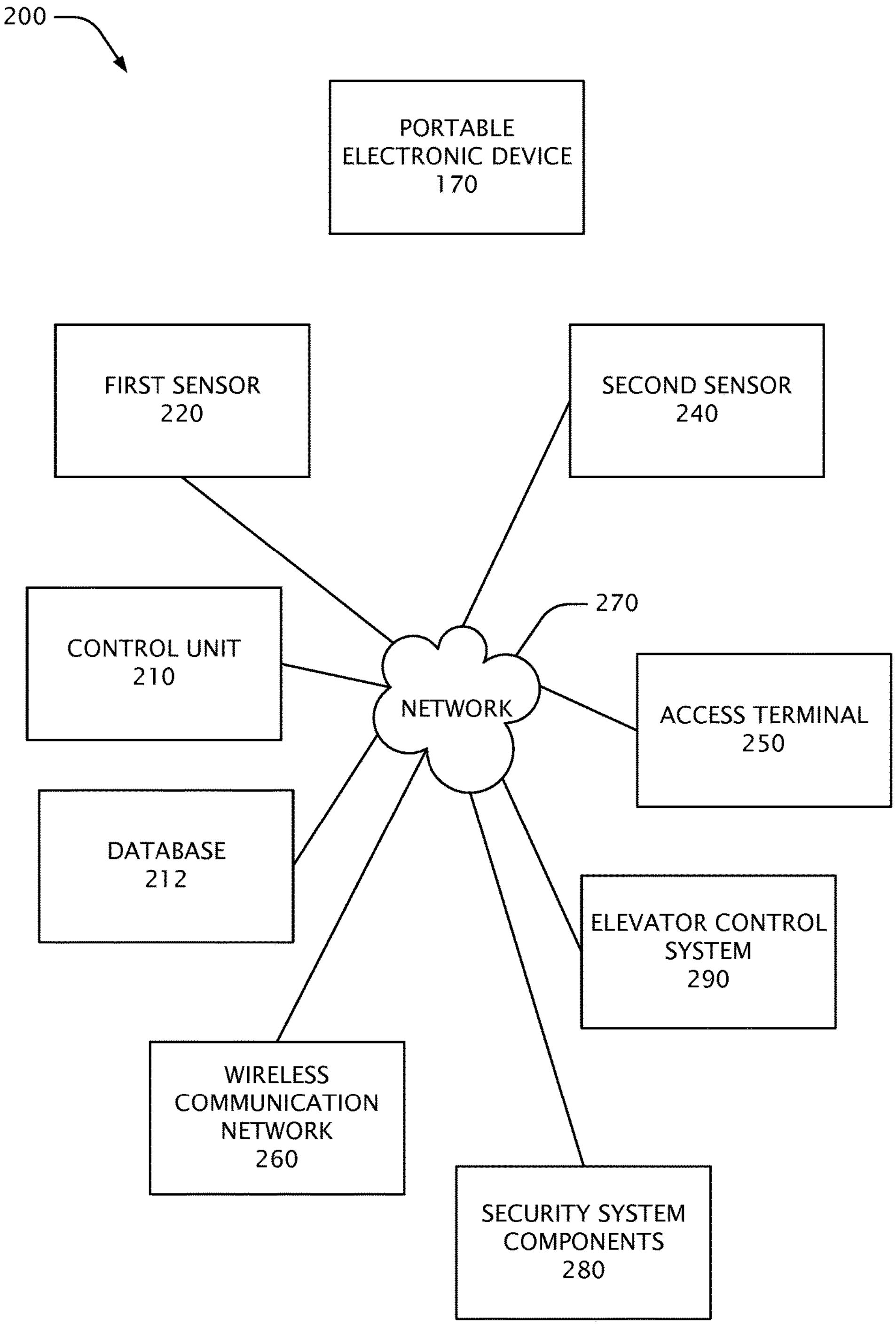
FIG. 2 shows a block diagram of an exemplary embodiment of an access control system.
Figure 3:
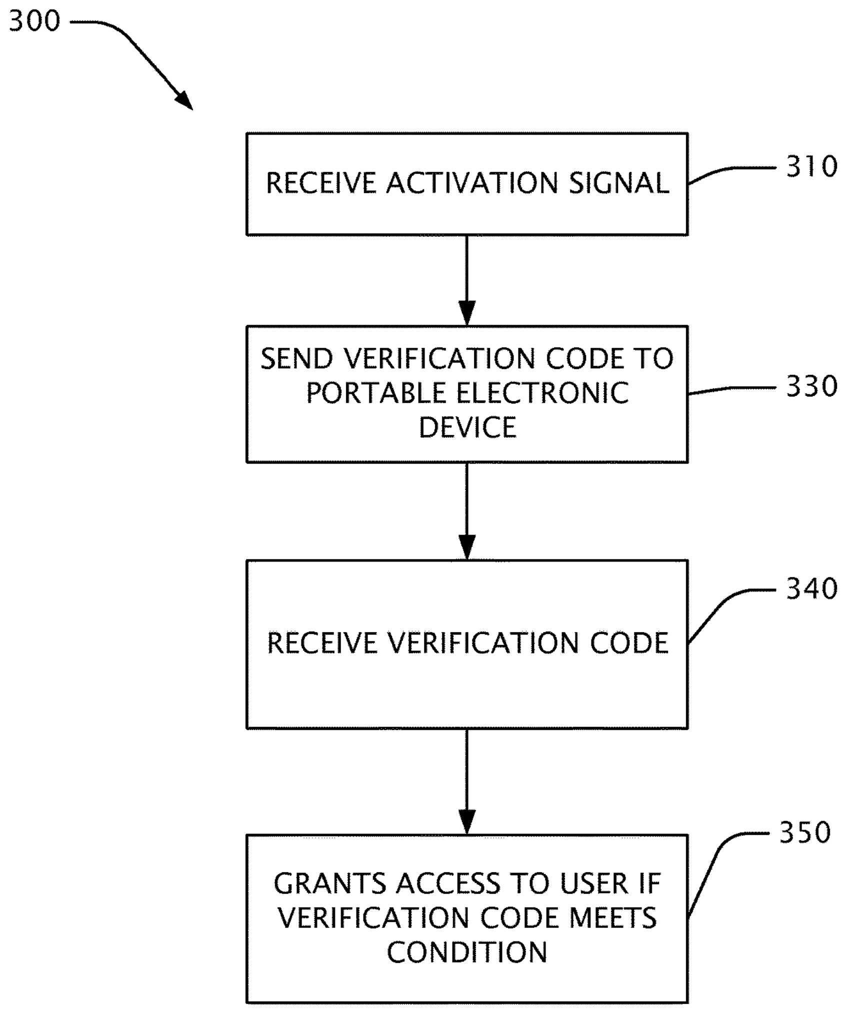
FIG. 3 shows a block diagram of an exemplary embodiment of an access control method.

FIG. 3 shows a block diagram of an exemplary embodiment of an access control method 300. The method 300 is for controlling access to a predetermined service (e.g., guidance within a building, or transportation (elevator service)) or area, such as the area 112 of FIG. 1. Although the method 300 is described here in the context of the system 200 of FIG. 2, the method 300 can also be used with other system embodiments. In an exemplary scenario described with reference to FIG. 3, information related to an access code has been sent to the portable electronic device 170. The information is sent through a wireless communication network, such as the network 260 of FIG. 2, for example in form of an SMS to the portable electronic device 170. The SMS includes in one embodiment a web link the user is required to touch on the portable device 170 to activate the access code. At this stage, the user is in possession of an access right.

When the user intends to use the access right, the user touches a web link that is displayed on the portable device 170 and contained in an SMS. The system notes that the link has been used and interprets this as a request for a verification code. In a method act 310 the system then receives an activation signal indicative of the user’s activation of the access code.

Alternatively, the request for a verification code may be triggered in a different way: The user may activate the access code by touching a web link contained in an SMS. In response to using the web link, the system downloads the access code, e.g., in form of an optical code (e.g., bar code, QR code or color code) to the portable electronic device 170. Then the user then presents the portable electronic device 170 with the displayed optical code at an access terminal, the system interprets this as a request for a verification code and receives in the method act 310 the activation signal.

In a method act 320, as a result of receiving the activation signal, the system sends a verification code to the portable electronic device 170 of the user 150. In one embodiment, the verification code or information related to the verification code can be sent to the portable electronic device 170 in the same way the information related to the access code has been sent, e.g., via an SMS or email. The SMS or email may include a web link for downloading the verification code as an optical code.

Certain applications may require that only a known and authorized user may access the area 112, but not a person that—in whatever way, legal or illegal—obtained the access code). In the method act 320, the system requests an authentication to ensure that access is granted only to the known and authorized user that originally requested access to the area 112, for example, by ordering the access code. In response, the system retrieves from the database 212 a predetermined verification code or generates a new verification code.

Proceeding to a method act 330, the system receives the verification code at an access terminal 180. In certain embodiments, the user may enter the verification code at the access terminal, e.g., by keying in a PIN, or the sensor in or near the terminal (e.g., the second sensor 240) senses the verification code, e.g., in form of an optical code, from the portable electronic device 170 when presented to the sensor.

In a method act 350, the system grants access to the predetermines service or area if the verification code is received at the access terminal 180 meeting one of several predetermined conditions.

In one embodiment, a first condition requires that the access terminal 180 receives the verification code within a limited validity time. The verification code may be valid for only limited amount of time. The validity time is in one embodiment based on an expected time for providing the verification code to the access terminal after receipt by the portable electronic device 170. If the user is already at the access terminal, the user can provide the verification code essentially immediately upon receipt and the validity time can be very short, e. g., a few seconds. In an embodiment with a lower security level, the validity time may be longer, e. g., a few minutes (e. g., 1 minute, 2 minutes, 5 minutes, 10 minutes), which is selected to be as short as possible.

In another embodiment, a second condition requires that the access terminal 180 receives the verification code without having been involved in generating the activation signal. That is, during an instant access procedure, the access terminal 180 was not previously involved, for example, it did not read information from portable electronic device 170. This may be the case if the access terminal 180 receives the verification code after another access terminal was involved in generating the activation signal in response to the user 150 presenting the access code.

The access code or information related to the access code (such as a web link) can be sent to the portable electronic device 170 in form of a text message (SMS), a push notification, an e-mail message, or a message sent using another messaging technology.

If in one embodiment an access control program is running on the device 170, the access code is stored by that access control program. In some cases, a message notification is generated by the program to tell the user that the device 170 has received the access code, or that the user can authenticate to or “unlock” the device (the concept of unlocking a device is explained below). The program can run as part of an operating system for the device 170, or as a separate application (e.g., a mobile telephone “app”).

In some embodiments, the portable electronic device 170 is also in a locked state when the system sends the access code to the device 170. When the user presents the device 170 to the terminal and the system reads the access code in the method act 310, the device 170 is in an “unlocked”state. In this application and in the claims, the device 170 is “locked” in the sense that at least some functionality of the device 170 or some information stored in the device 170 is unavailable unless the user “unlocks” the device 170 by authenticating to the device 170. For example, with some smartphones a user must type in a PIN or input other information into the phone to access programs or data stored on the phone. Other devices can be unlocked using biometric data (e.g., a fingerprint), a gesture on a touch-sensitive area, or a combination of input types. In particular embodiments, the terminal can determine that the mobile electronic device is in an unlocked state based on information received from an app running on the device 170. For example, the app can indicate that the user is currently using the app. In further embodiments, whether the device 170 is locked or unlocked is irrelevant to the operation of the technology.

In particular embodiments, the access code is generated by a web server. The web server sends the access code to the database, the control unit, and the portable electronic device 170. In further embodiments, the access code is generated by the database, which then sends the access code to the control unit and to the portable electronic device 170. The access code can also be generated by the control unit. The verification code can be generated accordingly.

In any of the disclosed embodiments, the validity of the access code can be limited to a certain amount of time after the code is sent to the portable electronic device 170 (e.g., 1 minute, 2 minutes, 5 minutes, 10 minutes), limited to a certain time period (e.g., Wednesday between 9 AM and 10 AM), or to a certain number of uses (e.g., the access code can be used only once, twice, five time, ten times, or another number of times). As mentioned above, the verification code is preferably limited to a certain amount of time because the user is already at the access terminal and can enter the access code essentially without a delay. In such a situation, the verification takes places while the user is at the access terminal expecting to access the area.

Figure 4:
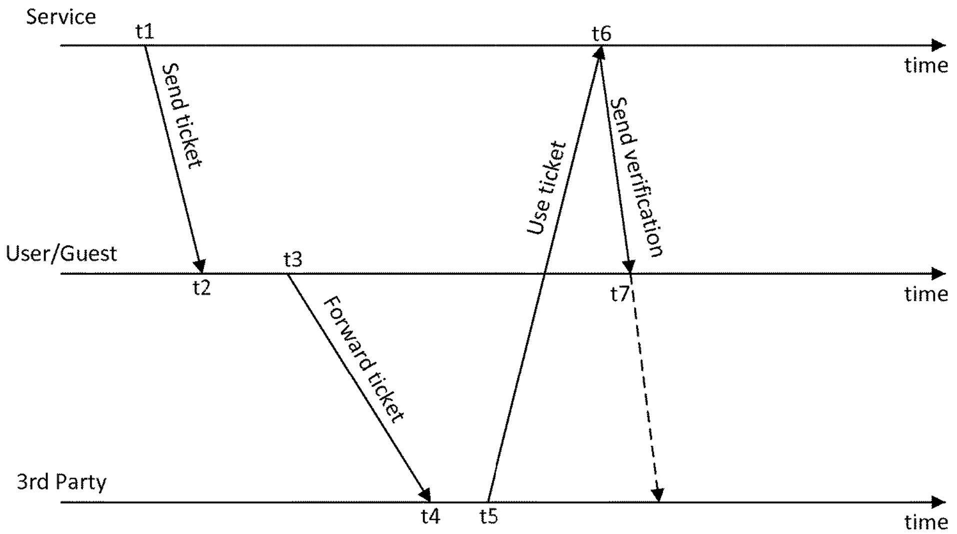
FIG. 4 shows a signal diagram of an exemplary exchange of signals between a service provider, a user and a 3rd party.

FIG. 4 is an illustration of a particular embodiment relating to a situation in which a user receives a personal, non-transferable invitation for an event at a specified location. A service provider and a $3^{rd}$ party are additional entities in this scenario. The various acts of these entities are shown as a function of time (t). In response to the user’s acceptance of the invitation, the service provider sends at a time t1 an electronic ticket (i.e., an access right) via SMS (or email) to the user’s portable device identified when ordering or accepting the ticket. The access code and e.g., the telephone number of the portable device are therefore associated in a database, e. g., the database 212. The user receives the electronic ticket at a time t2 by means of the portable device. At a time t3, the user decides to forward the ticket to the $3^{rd}$ party, e. g., due to a scheduling conflict. The $3^{rd}$ party’s portable device receives the ticket at a time t4. At a time t5, the 3$^{rd}$ party decides to use the ticket and presents it at a time t5 at the access terminal at the event location. As a result of presenting the ticket, an activation signal is generated.

As described above, the system responds to the sensing of the ticket (presented by the 3$^{rd}$ party) by requesting an authentication. The system sends at the time t6 a verification code to the portable device of the user, i.e., the original and intended invitee. The verification code may be viewed as a confirmed or second ticket. The 3$^{rd}$ party waiting at the event location, however, does not receive the verification code; in FIG. 4, this is indicated through a broken arrow to the time line of the 3$^{rd}$ party. Unless the original invitee is able to forward the verification code to the 3$^{rd}$ party within the time the verification code is valid, the system denies access to the 3$^{rd}$ party. If the time is set for essentially immediate code input, the 3$^{rd}$ party will not be able to receive the verification code in time, and access is denied to the 3$^{rd}$ party. This ensures that access is granted only to the original invitee.

In that way, the technology also protects against fraud. In case the 3$^{rd}$ party obtained the access code illegally, e.g., by intercepting communications of the user, the access code is useless unless the 3$^{rd}$ party is also able to obtain the verification code while at the access terminal at the event location. Further, even if the 3$^{rd}$ party were in possession of the portable electronic device (with the access code and the verification code), the 3$^{rd}$ party must in certain embodiments be able to unlock the device to gain access to the event location.

The several embodiments of the technology described above illustrate a concept that requires a first act (e.g., generating of an activation signal) to be performed before a second act (e.g., granting access upon receiving the verification code) can be performed. That concept can be applied to settings other than access control. For example, in an airport application, a passenger may first have to check any luggage before the access system grants the user access to the boarding area. For example, upon arrival at the airport, the passenger proceeds to the check-in area of an airline that issued the passenger's electronic ticket (i.e., the access code).

There, at the luggage drop-off section or at the check-in counter, combined with luggage drop-off, the passenger presents the portable electronic device with the displayed electronic ticket to a reader. In response, the system sends a verification code to the same portable electronic device that received the (original) electronic ticket. If the passenger does not have to check any luggage, the passenger needs to confirm that, either by presenting the electronic ticket on the portable electronic device to a reader in the check-in area or by sending a corresponding message to the ticket-issuing system. In both cases, the verification code is sent to the portable electronic device. At the time the passenger is at an entrance of the boarding area, the passenger presents the updated electronic ticket to a reader at the entrance. If the system verifies the updated electronic ticket, the system grants the passenger access to the boarding area.

Referring in a further embodiment again to an application in connection with an airport, the user (passenger) may be required to not only show an access code but also other travel documents, such a passport, to check and verify the user's identity. For that purpose, the user's name or passport number may be displayed on the portable electronic device when the user first uses the access code. Security personnel may then compare the displayed name and/or passport number with the user's physical passport document. If there is a match, the user can proceed by presenting, e.g., the optical code displayed on the portable electronic device to an optical reader at an access terminal.

Figure 5:
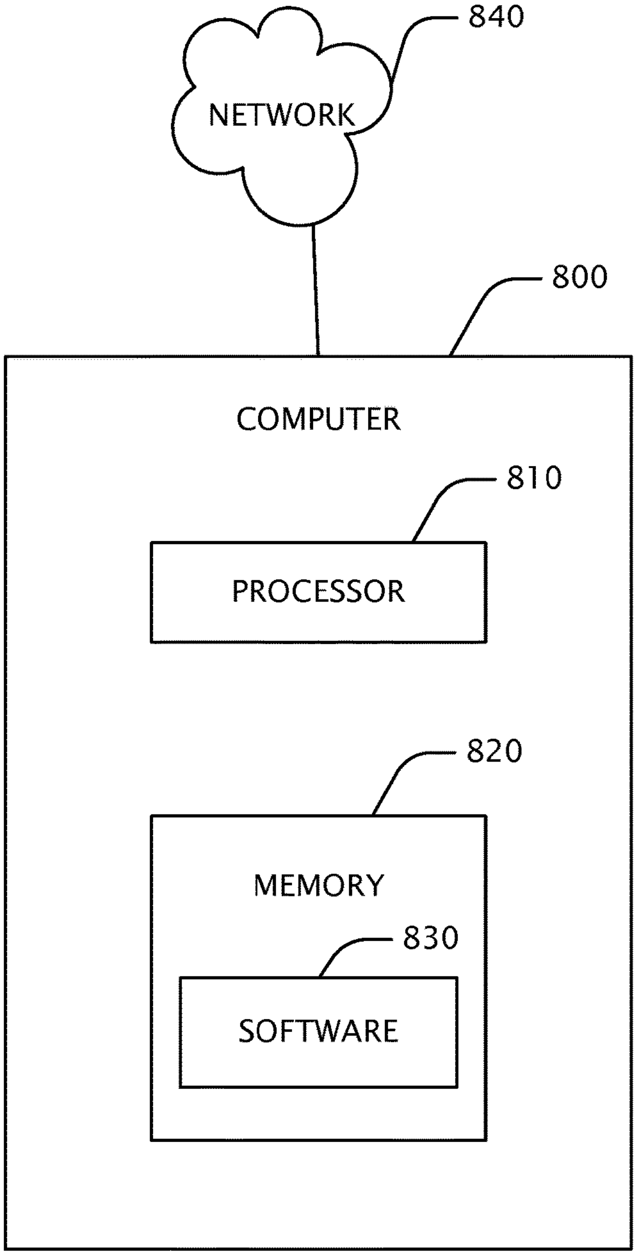
FIG. 5 shows a block diagram of an exemplary embodiment of a computer.

FIG. 5 shows a block diagram of an exemplary embodiment of a computer 800 (e.g., part of an access control system control unit, part of a portable electronic device 170, part of an access terminal, part of an elevator control unit, part of a database, part of a wireless communication network) that can be used with one or more technologies disclosed herein. The computer 800 comprises one or more processors 810. The processor 810 is coupled to a memory 820, which comprises one or more computer-readable storage media storing software instructions 830. When executed by the processor 810, the software instructions 830 cause the processor 810 to perform one or more of the method acts disclosed herein. Further embodiments of the computer 800 can comprise one or more additional components. The computer 800 can be connected to one or more other computers or electronic devices through an input/output component (not shown). In at least some embodiments, the computer 800 can connect to other computers or electronic devices through a network 840. In particular embodiments, the computer 800 works with one or more other computers, which are located locally, remotely, or both. One or more of the disclosed methods can be performed using a distributed computing system.

At least some of the disclosed embodiments can provide more convenient and user-friendly access control. For example, to access a secure area, a user does not need to carry a token besides the portable electronic device 170, which can be something that the user keeps with him or her for additional purposes, such as a smartphone. Also, during operation of the system in some embodiments the user does not need to manually input or even know the access code.

At least some of the disclosed embodiments can provide increased security compared to single-factor-authentication methods where, for example, only a token or only a password is required. Embodiments requiring a user to be in possession of a portable electronic device 170, to be able to unlock the device 170 and to be able to enter a verification code can serve as an improved multiple-factor-authentication methods.

Particular disclosed embodiments can provide increased security by using different types of first and second communications channels. Any combination of technologies can be used for the communications channels. For example, the first communication between an access terminal and the portable electronic device may occur via a Bluetooth or Bluetooth LE connection, while the access code is sent to the device 170 using a telephone connection (e.g., as a text message). If the Bluetooth or Bluetooth LE device address has been faked by a third party (e.g., to make it appear that the third party's device is the user's device), the access system will still send the access code to the user's device through the second communication channel. The user's device will receive the access code, even though the user's device was not near a sensor of the access control system. Similarly, the user's device will receive the verification code when the access code is sensed at an access terminal. The user can then recognize that the third party is attempting to emulate the user's device.

Figure 6:
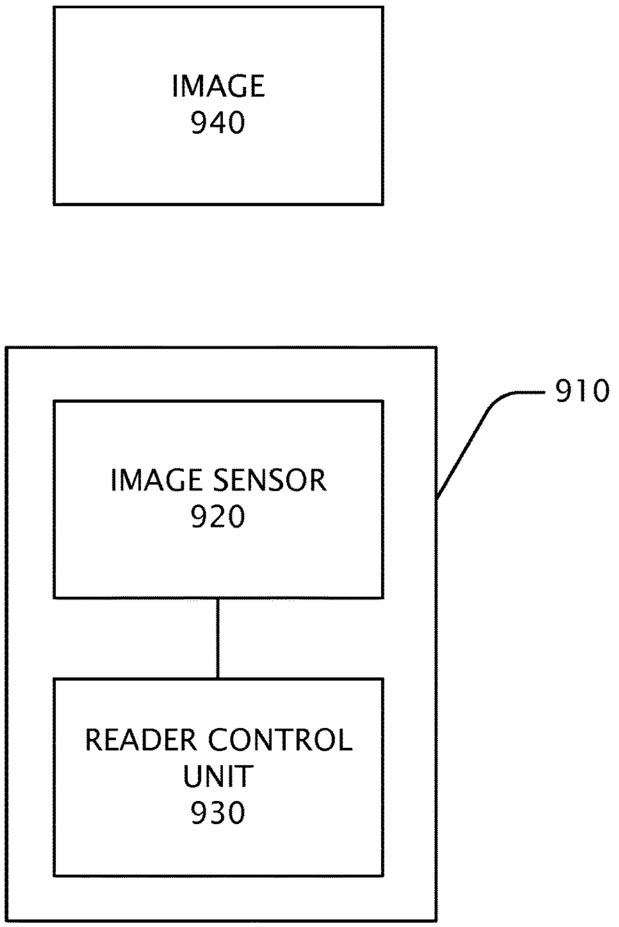
FIG. 6 shows a block diagram of an exemplary embodiment of an optical reader.

FIG. 6 shows a block diagram of an exemplary embodiment of an optical reader 910 as it may be installed in the access terminal of FIG. 1 and coupled to the computer 800 of FIG. 6. The reader 910 comprises an image sensor 920 coupled to a reader control unit 930. The image sensor 920 comprises, for example, a CCD (charge-coupled device) sensor, a CMOS (complementary metal-oxide semiconductor) sensor, or another type of optical sensor. In some cases, the image sensor 920 can focus on an image; in other cases, the image sensor 920 is not equipped to focus on an image. The image sensor 920 can have a lens, or it can function without a lens. The reader control unit 930 is a computer-based device comprising a processor that is programmed to perform one or more of the method acts disclosed in this application. The processor can be coupled to a memory that stores corresponding instructions for the processor. The reader 910 senses ("reads") an image 940. The image 940 appears on a display of a portable electronic device (not shown), or on another surface (e.g., a piece of paper).

Optical codes used by the embodiments described in this application are one- or two-dimensional images. At least some of the example optical codes depicted in the application are generally square in shape, but other optical codes can have other shapes (e.g., rectangular, round, oval, triangular, or another shape). Information encoded in an optical code can include, for example, a number, a letter, a combination of letters and numbers, or any other type of information.

Information encoded in the optical codes described in this application can be extracted from the code even if a portion of the code is not visible to the optical reader. This is possible because the encoded information is represented in multiple regions of the code. Specifically, particular features that represent the encoded information are repeated in multiple areas of the code. (Examples of such features are described elsewhere in the application.)

Figure 7:
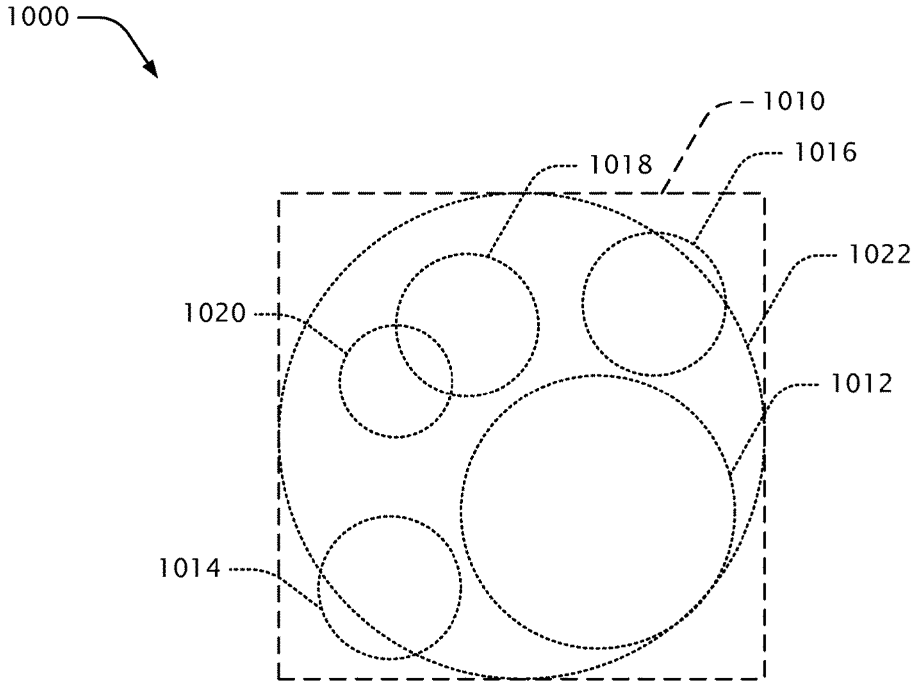
FIG. 7 shows an optical code.

FIG. 7 shows an optical code 1000 having an area 1010. (For clarity, detailed features of the code 1000 are not shown in FIG. 7.) In this example, a so-called encoding region 1012 contains sufficient features to represent the encoded information. The encoding regions 1014, 1016, 1018, and 1020 also each contain sufficient features to represent the encoded information. As seen in this example, encoding regions can have various sizes and positions. Two encoding regions can also partially overlap, such as the regions 1018, 1020. The region 1022 is an example of an encoding region that contains one or more other encoding regions. The information contained in any one of the regions 1012, 1014, 1016, 1018, 1020, 1022 is sufficient to allow the optical reader to decode the information encoded in the optical bode 1000, even if one or more other portions of the code are not visible to the reader. A portion of the code may not be visible because, for example: the code is partially obscured by an object (e.g., a user's finger is on part of the display that is showing the code); the optical code is so close to the image sensor of the optical reader that some of the code is outside of the sensor's field of view; the image sensor is dirty or damaged; the display on which the code appears is dirty or damaged; or for another reason.

Generally, the larger the number of encoding regions in a code, the more likely that the code will be read successfully. Although the encoding regions shown in FIG. 7 are all circular, encoding regions can also have other shapes (e.g., rectangular, round, oval, triangular, or another shape). Although the regions shown in FIG. 7 are each single, adjacent areas, in further embodiments an encoding region can comprise two or more non-adjacent areas. Each of the non-adjacent areas may or may not by itself contain sufficient features to represent the encoded information, but together they do contain sufficient features.

In at least some embodiments, the number and arrangement of the encoding regions of an optical code are selected according to a known or expected sensing area of an optical reader. The term "sensing area" refers to the area of the optical code that is captured by the optical reader. In different embodiments, the sensing area can have various shaped (e.g., rectangular, round, oval, triangular, or another shape). The "minimal sensing area" is the smallest area of the optical code that an optical reader can capture and still have enough sufficient features to decode the encoded information. In other words, the minimal sensing area needs to contain an encoding region of the optical code. Thus, the encoding regions of an optical code can be arranged such that, regardless of which portion of the optical code is read by the optical reader, as long as the portion is at least as large as the minimal sensing area, the reader can decode the encoded information from the optical code at any position within the code. Of course, in many cases an optical reader might capture as large of a portion of the code as possible, and so the actual sensing area can be larger than the minimal sensing area. A sensing area or a minimal sensing area can comprise a single, adjacent area, or it can comprise two or more non-adjacent areas.

When generating an optical code, it can be assumed that the minimal sensing are may not allow for a desired ease of decoding. For example, a minimal sensing area may provide enough information for decoding a code, but at a slower-than-desired rate, or at a higher-than-desired computational cost. For these reasons, a sensing area somewhat larger than the minimal sensing area can be used (e.g., an area that is larder by 1%, 5%, 10%, 15%, 20%, or by another amount). Using this larger sensing area can make decoding the code easier.

An optical code can be generated using one or more images. In some embodiments, the optical code is based on a single image. In further embodiments, the optical code is based on a combination of two or more images.

Figure 8A:
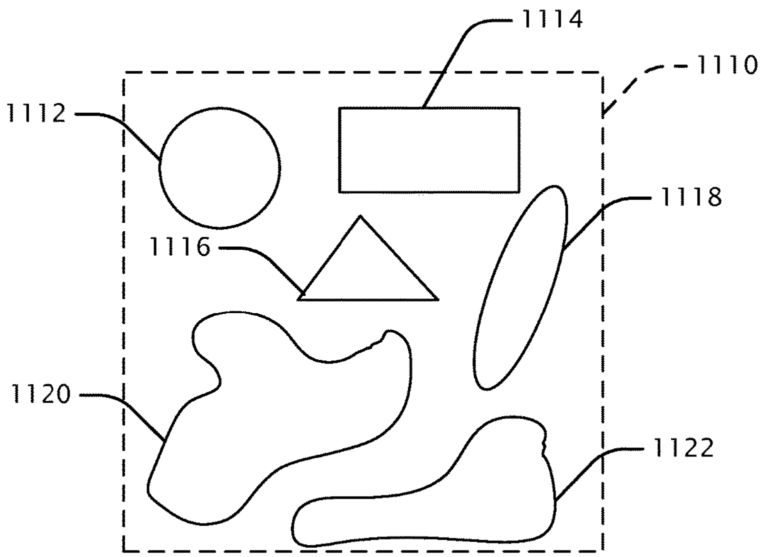
FIG. 8A shows a first exemplary image.
Figure 8B:
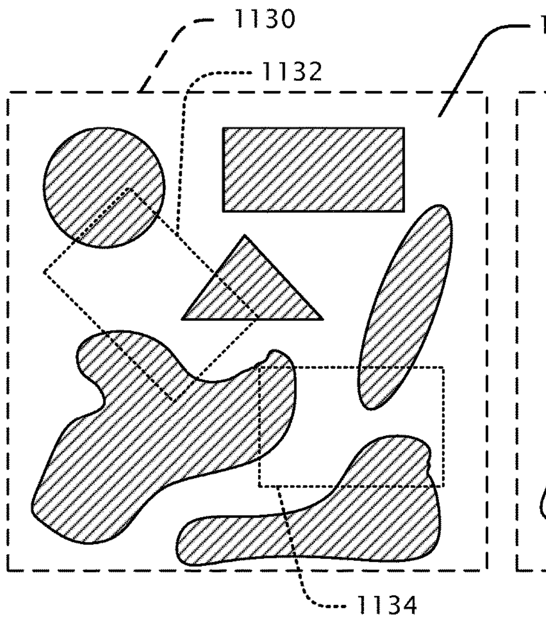
FIG. 8B shows a second exemplary image.
Figure 8C:
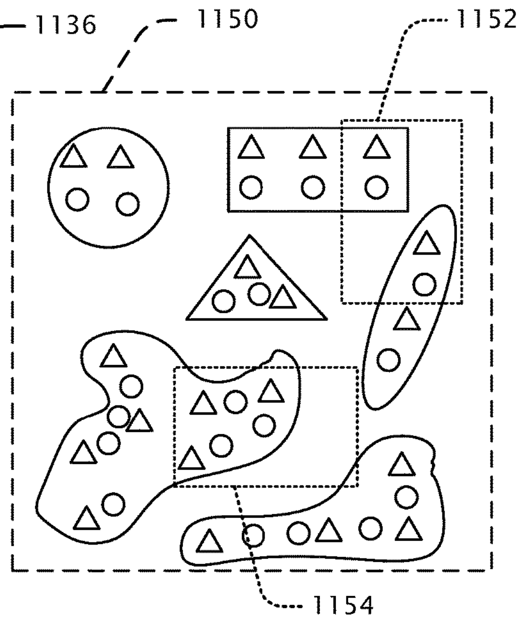
FIG. 8C shows a third exemplary image.

FIG. 8A shows an exemplary image 1110, which consists of multiple shapes 1112, 1114, 1116, 1118, 1120, 1122. Although it is not apparent from the line drawing, these shapes are each filled with the same solid color, FIG. 8B shows another exemplary image, which consists of multiple shapes like those in the image 1110. However, in this case, the surfaces are filled with a pattern, instead of with a solid color. FIG. 8C shows another exemplary image 1150, which consists of multiple shapes like those in the image 1110. However, in this case, the surfaces are filled with additional shapes, namely small triangles and small circles. In further embodiments, gradients can be used in an image, including shapes that are formed from gradients and thus appear to lack clearly defined borders.

The rectangle 1132 in FIG. 8B represents a minimal sensing area for an optical reader that is reading the image 1130. In this case, the portion of the image 1130 within the rectangle 1132 is filled by both patterned shapes of the image 1130 and by a background 1136. The presence of the shapes and of the background indicates the particular data that is encoded in the image. The rectangle 1134 represents another minimal sensing area for the image 1130. Also in this case, the portion of the image 1130 within the rectangle 1134 is filled by both patterned shapes and by the background 1136. A sensing area larger than the minimal sensing areas 1132, 1134 would likewise cover portions of both the background and the patterned shapes. In the case of FIG. 8B, the background 1136 can be, for example, a solid color or another pattern.

In various embodiments, the background of an image is not used to encode data, but to help calibrate the image sensor of the optical reader. The background can also serve as a decoration.

Turning to FIG. 8C, the rectangles 1152, 1154 each represent minimal sensing areas for an optical reader that is reading the image 1150. In this particular image, the relevant feature is the ratio of the number of small triangles to the number of small circles within a predefined areas. In each of the areas 1152, 1154, the ratio of small circles to small triangles is 1:1. The optical reader can recognize this ratio and use it to identify the image 1150 (i.e., to distinguish the image 1150 from at least one other image). A sensing area larger than the minimal sensing areas 1152, 1154 would likewise cover a portion of the image 1150 in which the ratio of small circles to small triangles is 1:1, since this feature is generally consistent over the whole of the image 1150.

Figure 9:
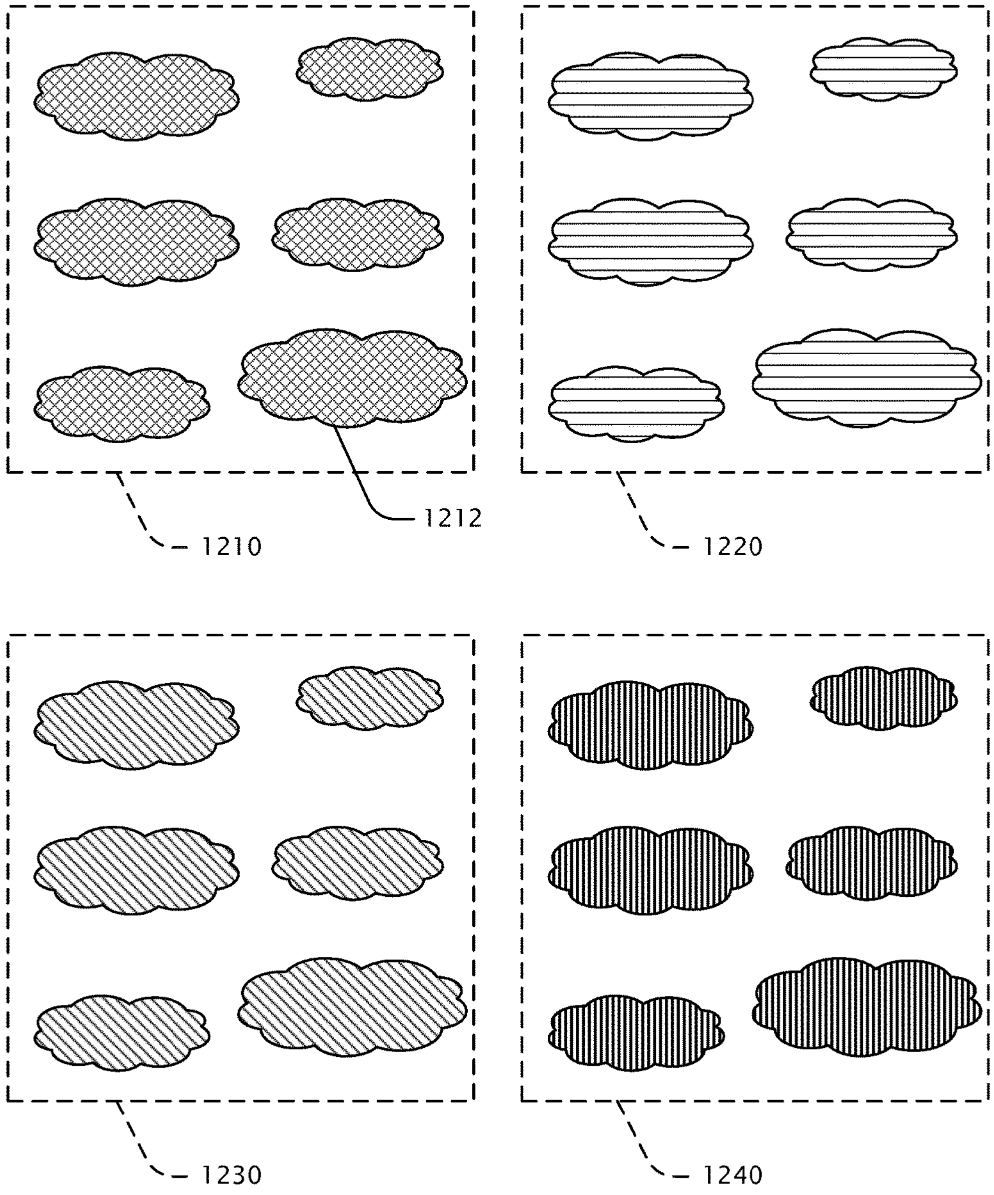
FIG. 9 shows exemplary images.
Figure 10:
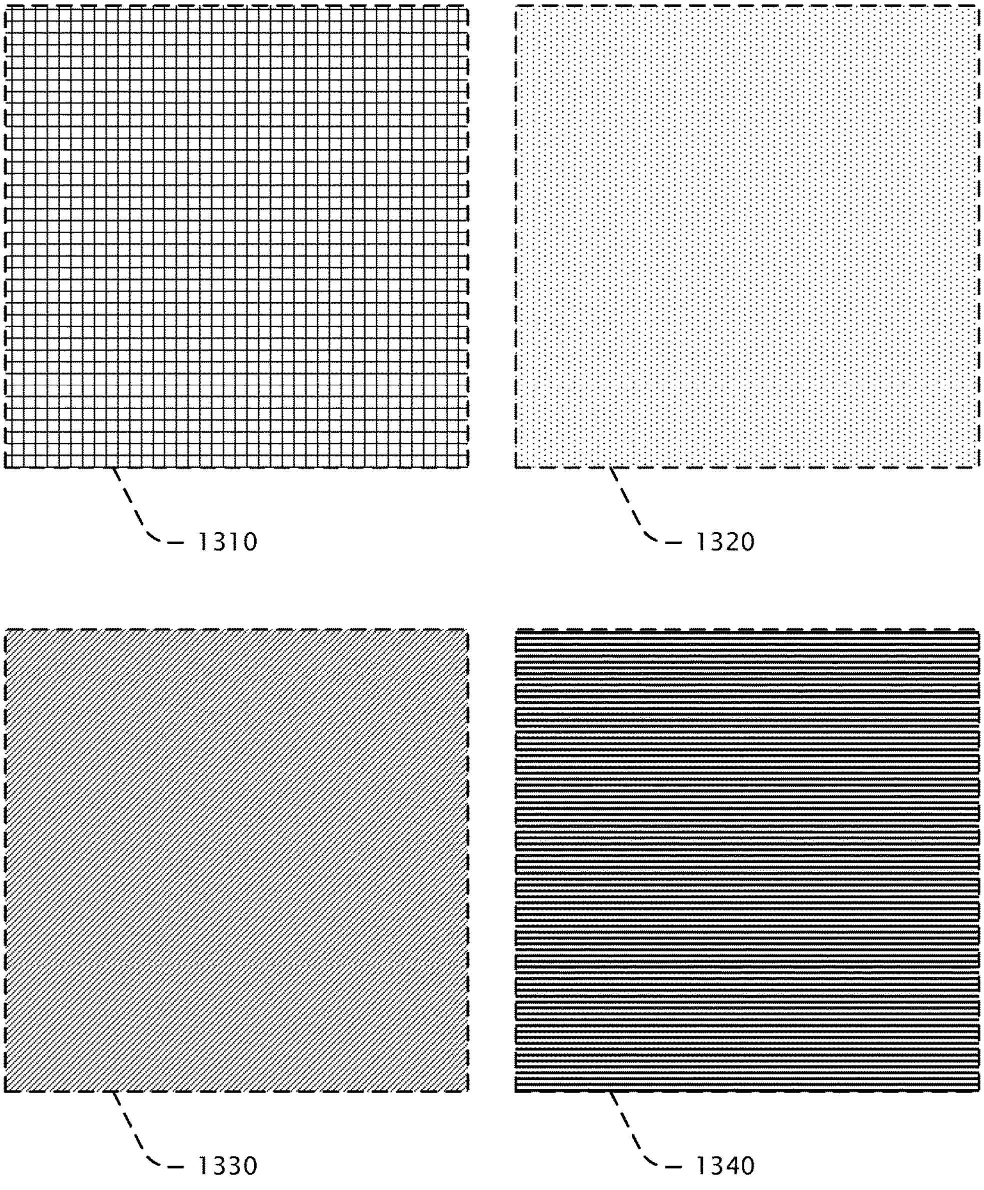
FIG. 10 shows exemplary images with respective patterns.
Figure 11:
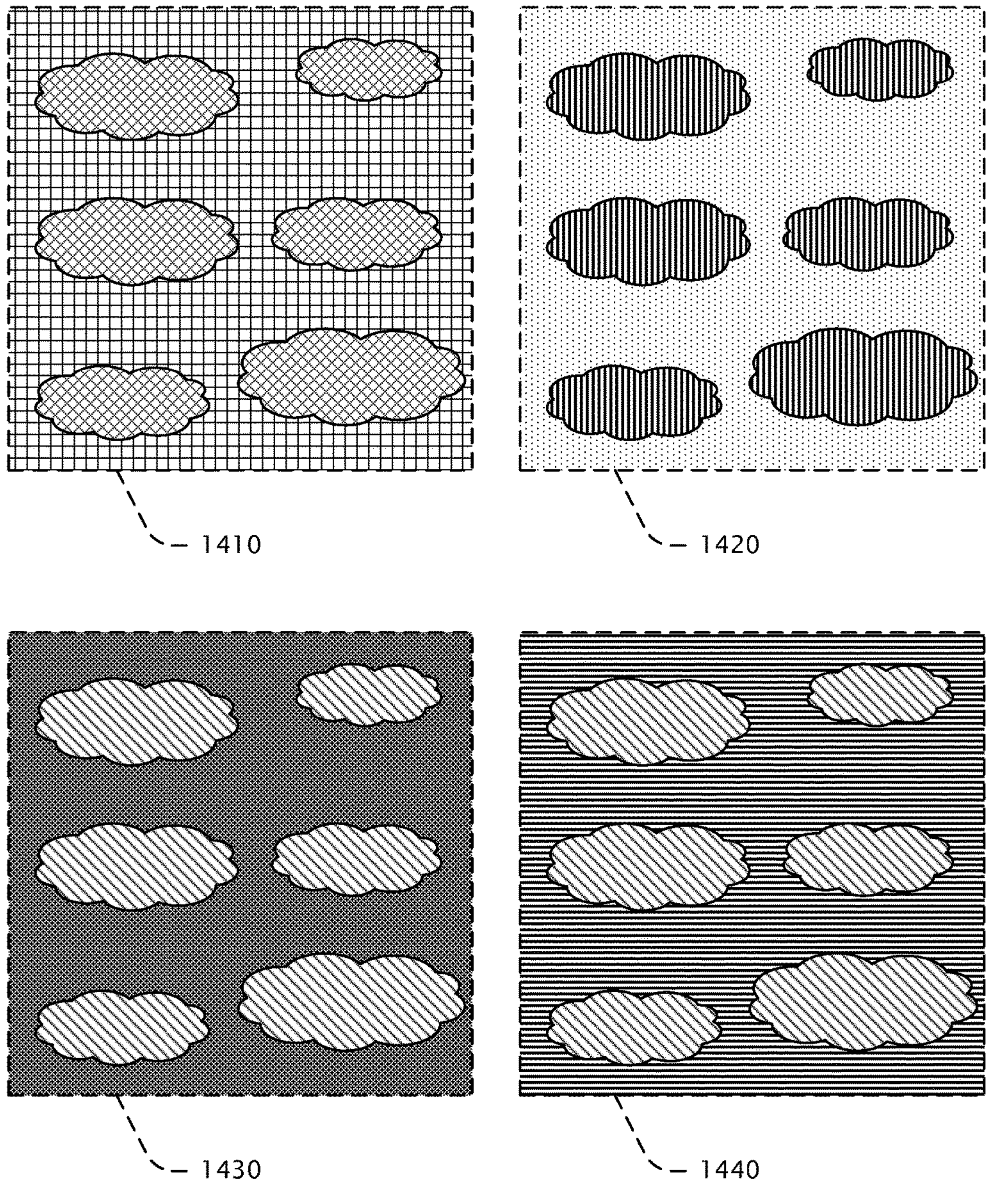
FIG. 11 shows exemplary combined images.

In some embodiments. an optical code is formed by combining one or more images. FIG. 9 shows exemplary images 1210, 1220, 1230, 1240, each of which comprises a group of shapes, such as the shape 1212 in image 1210. The images 1210, 1220, 1230, 1240 differ from each other in that their shapes are filled with different patterns. FIG. 10 shows exemplary images 1310, 1320, 1330, 1340, each of which is filled with a respective pattern. FIG. 11 shows how selected images of FIG. 9 and 10 could be combined with each other to create optical codes. For example, the image 1410 is a combination of the images 1210 and 1310; the image 1420 is a combination of the images 1240 and 1320; the image 1430 is a combination of the images 1230 and 1330; and the image 1440 is a combination of the images 1230 and 1340. Each of the images in FIG. 11 can be used to represent a particular value. For example, the image 1410 can indicate a "0", the image 1420 can indicate a "1", the image 1430 can indicate a "3", and the image 1440 can indicate a "4". Additional combinations based on the images of FIGS. 12 and 13 can also be used and assigned respective values.

In some embodiments, the images of FIG. 9 could be combined with a solid-colored background instead of with patterned backgrounds, like those of FIG. 10.

In further embodiments, elements of an optical code are arranged in a grid of spaces. The spaces in the grid can be square in shape, or they can have another shape. The spaces can have a border around the contents of the space (e.g., a black line, or a line of another color), or the spaces may have not border around their contents. Each element that is arranged in a space of the grid has a visible feature that allows the optical reader to distinguish it from another possible element (which may or may not actually be present in the grid). Possible features can include, for example: colors, patterns, shapes, gradients, letters, numbers, or other properties.

Figure 12A:
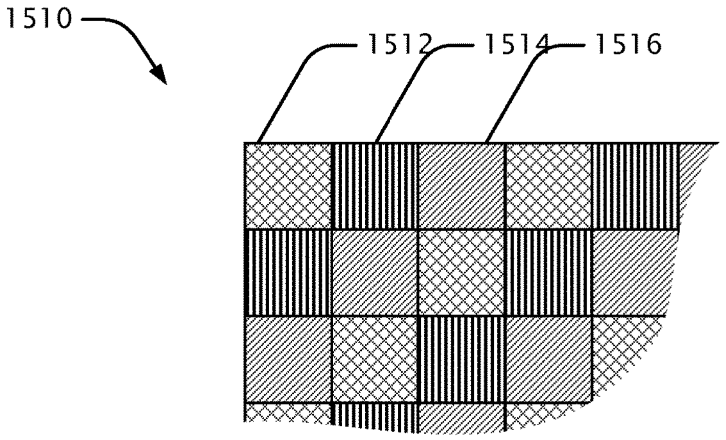
FIG. 12A shows portions of optical codes.

FIG. 12A shows an upper left-hand portion of an exemplary optical code 1510. The code 1510 comprises elements arranged in a grid, such as elements 1512, 1514, 1516. The elements 1512, 1514, 1516 are squares, each having a different fill pattern. The remaining square elements of the grid each have one of these fill patterns, such that the elements 1512, 1514, 1516 are repeated in sequence over the optical code 1510. The particular patterns used, the relative proportions in which elements with those patterns appear in the code 1510, or both, indicate the particular information encoded in the code 1510.

Figure 12B:
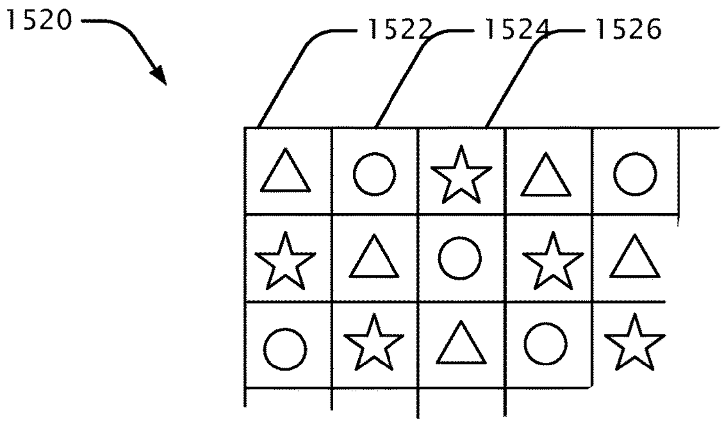
FIG. 12B shows portions of optical codes.

FIG. 12B shows an upper left-hand portion of an exemplary optical code 1520. The code 1520 also comprises elements arranged in a grid, such as elements 1522,154, 1526. These elements are squares, but they are filled with various shape; the element 1522 contains a triangle, the element 1524 contains a circle, and the element 1526 contains a star. The remaining square elements of the grid each contain one of these shapes, such that the elements 1522, 1524, 1526 are repeated in sequence over the surface of the optical code 1520. The particular shapes used, the relative proportions in which elements with those shapes appear in the code 1520, or both, indicate the particular information encoded in the code 1520.

Figure 13:
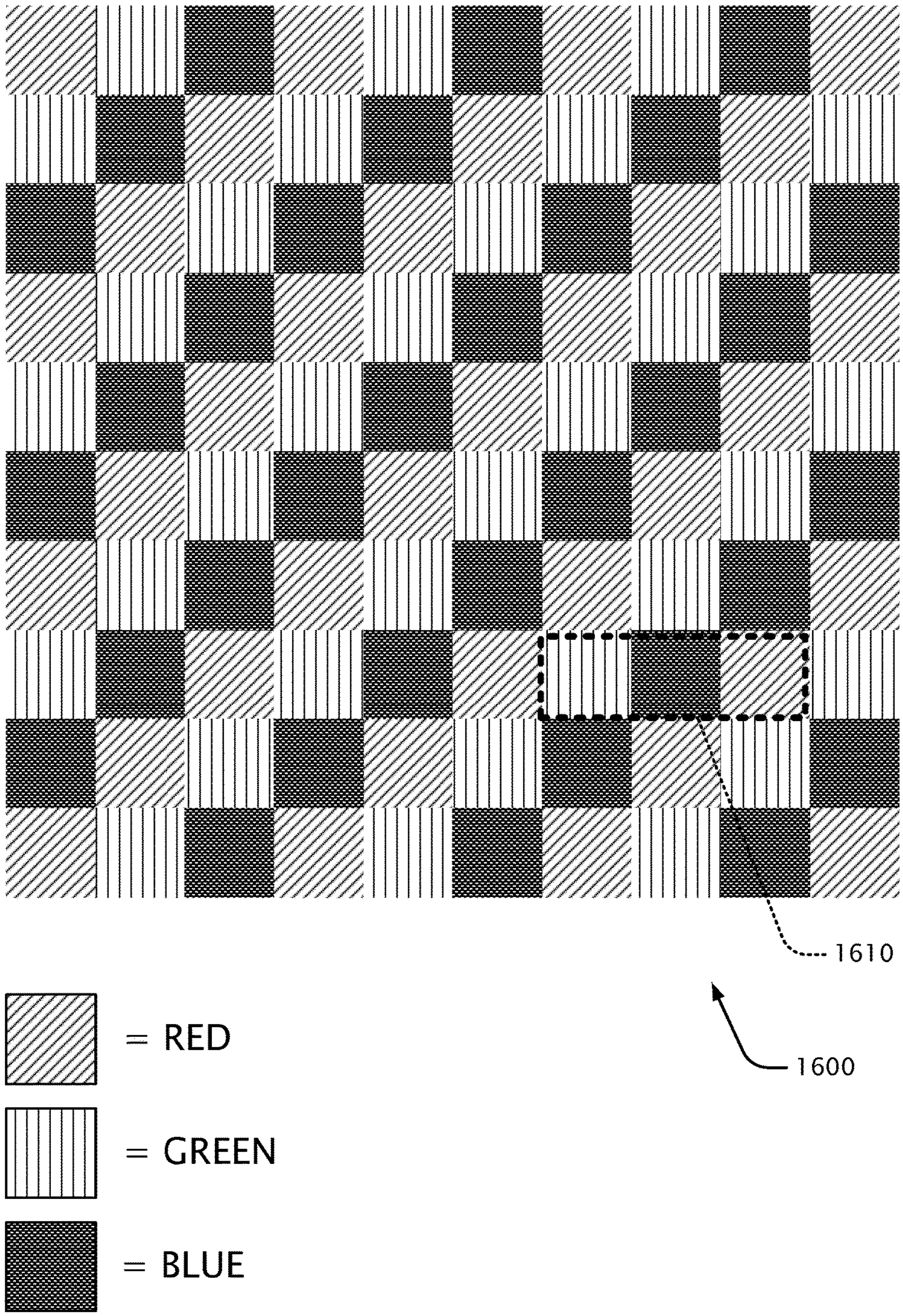
FIG. 13 shows an exemplary optical code in which the elements are arranged in a grid.

FIG. 13 shows an exemplary optical code 1600 in which the elements (color-fitted squares) are arranged in a grid. Each of the elements in the grid is a red, green, or blue square. (In the line drawing of FIG. 13, each of the colors is represented by a different pattern, as indicated in the figure.) In one embodiment, the elements are approximately 0.2-0.3 cm square; other element sizes can also be used. Although the example of FIG. 13 uses three different colors of squares, additional embodiments can use any number of colors (e.g., two colors, four colors, five colors, six colors, or another number of colors), any number of fill patterns, or both. Generally, using a smaller number of colors or patterns means that the colors or patterns can be more distinct from each other, and thus more easily distinguished by the optical reader. However, using a larger number of colors or patterns increases the amount of information that can be encoded in an optical code.

The rectangle 1610 represents a minimal sensing area for the code 1600. In this case, the rectangle 1610 has a size of approximately one element by three elements. This area is large enough to determine the ratio of the red, green, and blue squares in the code 1600. Of course, larger sensing area could also be used. For example, a sensing area that is three elements by three elements could be used. Depending on the embodiment, the ratio can be determined based on the number of squares, or based on the surface area occupied by the squares.

In some cases, the size of a minimum sensing area is at least partly a function of how many different types of elements are available (e.g., in this example, how many different colors of squares). For example, if the code 1600 could be constructed of squares of five different colors or ten different colors, then the rectangle 1610 would be too small to determine the ratio of all five colors or all ten colors. Generally, while the concept of minimal sensing area can be useful in understanding the disclosed technologies, the optical reader does not need to know or use a minimal sensing are a of a particular optical code when decoding the code. In particular embodiments, the optical reader is programmed to recognize one or more features of an optical code and, based on the recognized features and their sizes, determine the size of the image. The reader can then scale the image, if needed. Based on the size of the image, the reader can also determine the minimal sensing area for the optical code.

The code 1600 can be used with an embodiment in which the ratio of a set of colors determines the value encoded in the code. Table 1 below gives an example encoding scheme. In the table, "R" stands for red, "G" stand for green, and "B" stands for blue.

TABLE 1

| Encoded Value | Ratio (R:G:B) |
|---|---|
| 0 | 1:1:1 |
| 1 | 2:1:0 |
| 2 | 3:0:0 |
| 3 | 1:0:2 |
| 4 | 0:0:3 |
| 5 | 1:2:0 |

Applying the encoding scheme of Table 1 to the example of code 1600, the code 1600 contains an R:G:B ratio of 1:1:1. Thus, the code 1600 is interpreted as encoding a value of 0.

In particular embodiments, depending on factors such as the size of the grid, the number of colors used for the grid elements, and the pattern used in arranging the elements in the grid, the optical code would appear to be composed of vertical or horizontal colored bars instead of individual square elements.

In further variations of the embodiment of FIG. 13, the grid spaces are occupied by colored shapes other than colored squares. For example, rectangles, circles, ovals, triangles, crosses, rhombuses, trigrams, or other shapes can be used.

The examples of FIGS. 12A, 12B, and 13 describe embodiments in which elements (e.g., shapes, pattern-filled squares, color-filled squares) are repeated in a given order with a grid. In further embodiments. the elements in the grid are not repeated in any particular order. For example, the elements can be arranged in the grid in a random order, or in a pseudo-random order. However, in at least some cases, the minimal sensing area for an image can be smaller if the elements are repeated in a given order, since this can help ensure that the elements are distributed more evenly throughout the optical code.

The examples of FIGS. 12A, 12B, and 13 also describe embodiments in which a given set of elements is repeated along rows or along columns within the grid. For example, FIG. 13 shows a pattern of "red square, green square, blue square" repeated along each row of the grid. In further embodiments two or more sets of elements are repeated orthogonally to each other in a grid. In one example, a grid of colored squares contains a first set of elements, "red square, green square, blue square", and a second set of elements, "black circle, yellow star, green square gradient". The first and second sets are repeated over the grid, the first and second sets being arranged orthogonally to each other.

Figure 14:
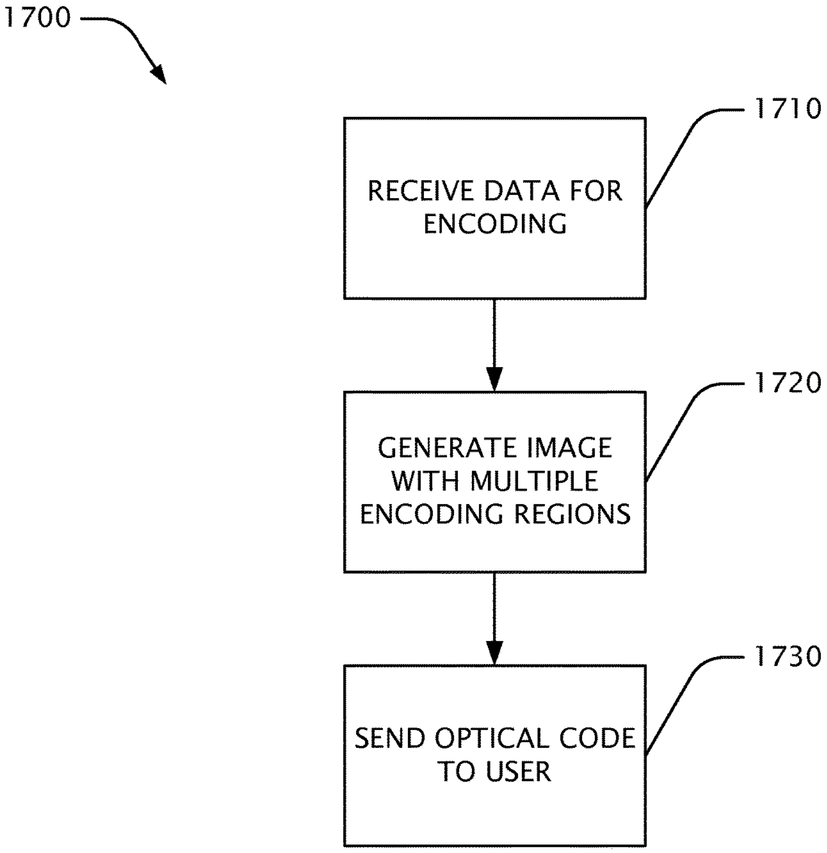
FIG. 14 shows an exemplary embodiment of a method for generating an optical code.

FIG. 14 shows an exemplary embodiment of a method 1700 for generating an optical code. The method 1700 is performed by a computer and can be used generally to generate any of the optical code embodiments discussed herein. In a method act 1710, the computer receives data for encoding in an optical code. The data comprises, for example, a number, a letter, a word, or another piece of information. In a method act 1720, the computer generates an image with multiple encoding regions, each of the regions containing a respective representation of the data. In other words, the data is encoded in each of the encoding regions so that, as discussed above, the data can be decoded using any one of the regions. In some cases, the optical code is sent to a user in a method act 1730. The user can then present the code to a code reader.

Figure 15:
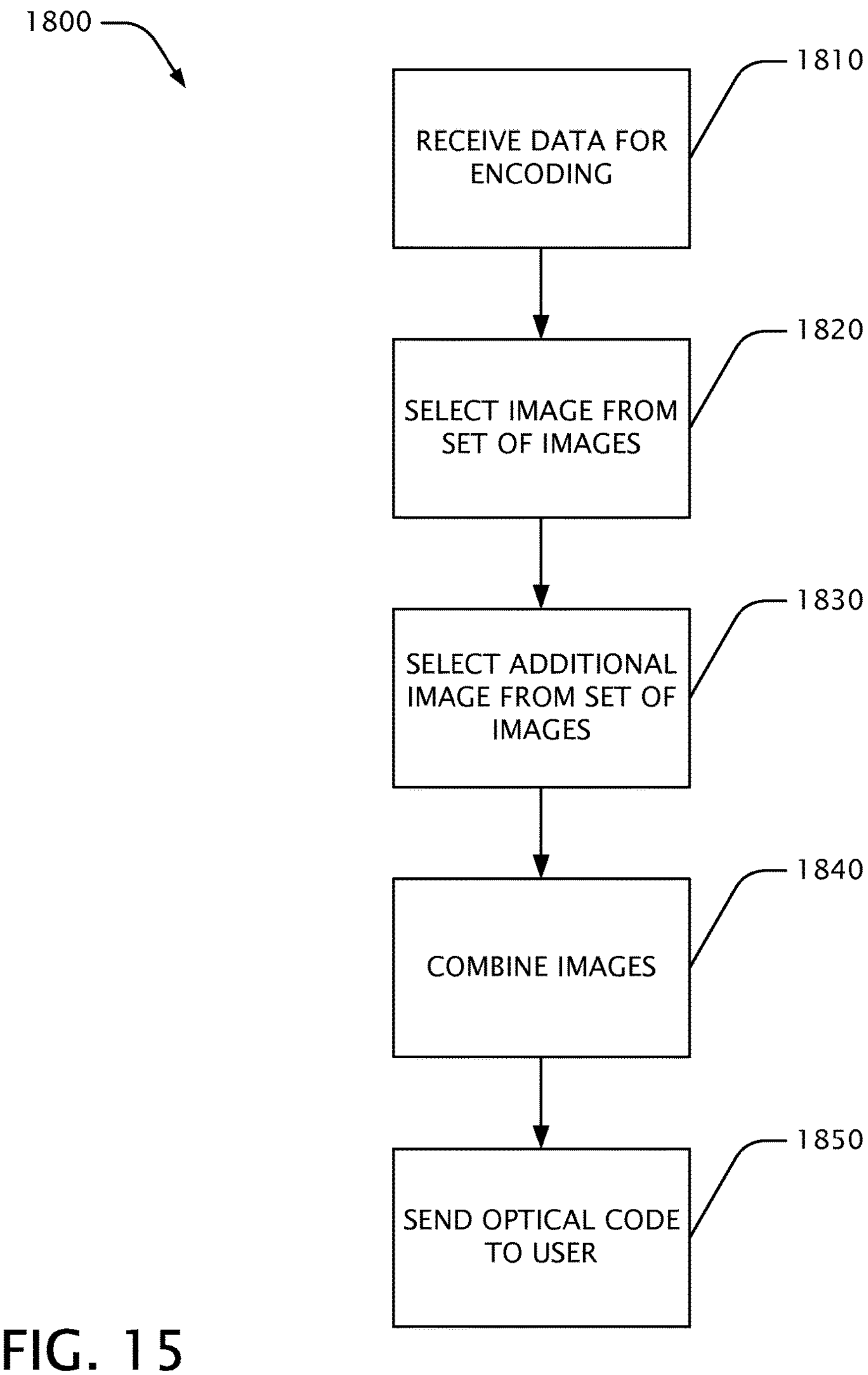
FIG. 15 shows an exemplary embodiment of another method for generating an optical code.

FIG. 15 shows an exemplary embodiment of another method 1800 for generating an optical code. Like the method 1700, the method 1800 is performed by a computer and can be used to generate any of the optical code embodiments discussed herein. In a method act 1810, the computer receives data for encoding in an optical code. The data comprises, for example, a number, a letter, a word, or another piece of information.

In a method act 1820, the computer selects an image from a set of encoding images. The encoding images are images that can be used to represent the data. For example, the image of FIG. 13, and the other images that are described in connection with the example of FIG. 13, can form a set of encoding images from which an image can be selected. The images from FIGS. 8A-8C can also form such a set. In some cases, the selected image contains at least two elements that represent a ratio indicating the encoded data. For example, the optical code 1150 of FIG. 8C contains small triangles and small circles, which represent a ratio. As another example, in FIG. 13, the red, green, and blue squares represent a ratio. In other cases, the presence of particular elements (e.g., elements of a certain color or pattern) indicates the encoded data. In some embodiments, the image selected in the method act 1820 forms the optical code.

In some embodiments, after an image is elected, an additional image is selected from a set of encoding images in a method act 1830. The selected images are combined in a method act 1840 to form the optical code. The images of FIGS. 9 and 10 are examples of sets of images from which the two images could be selected. FIG. 11 shows examples of combined images created from the images of FIGS. 9 and 10.

Whether an optical code is generated based on combined images or on a single image depends on the particular embodiment. In many cases, similar or identical optical codes can be generated using single or combined images. For example, the image of FIG. 13 could be generated by combing three images, each comprising sets of squares for a respective color. As another example, the images of FIG. 11 could also each be stored as single images, so that they need not be generated from two separate images when used.

Returning to FIG. 15, in some cases, the optical code is sent to a user in a method act 1850. The user can then present the code to a code reader.

Figure 16:
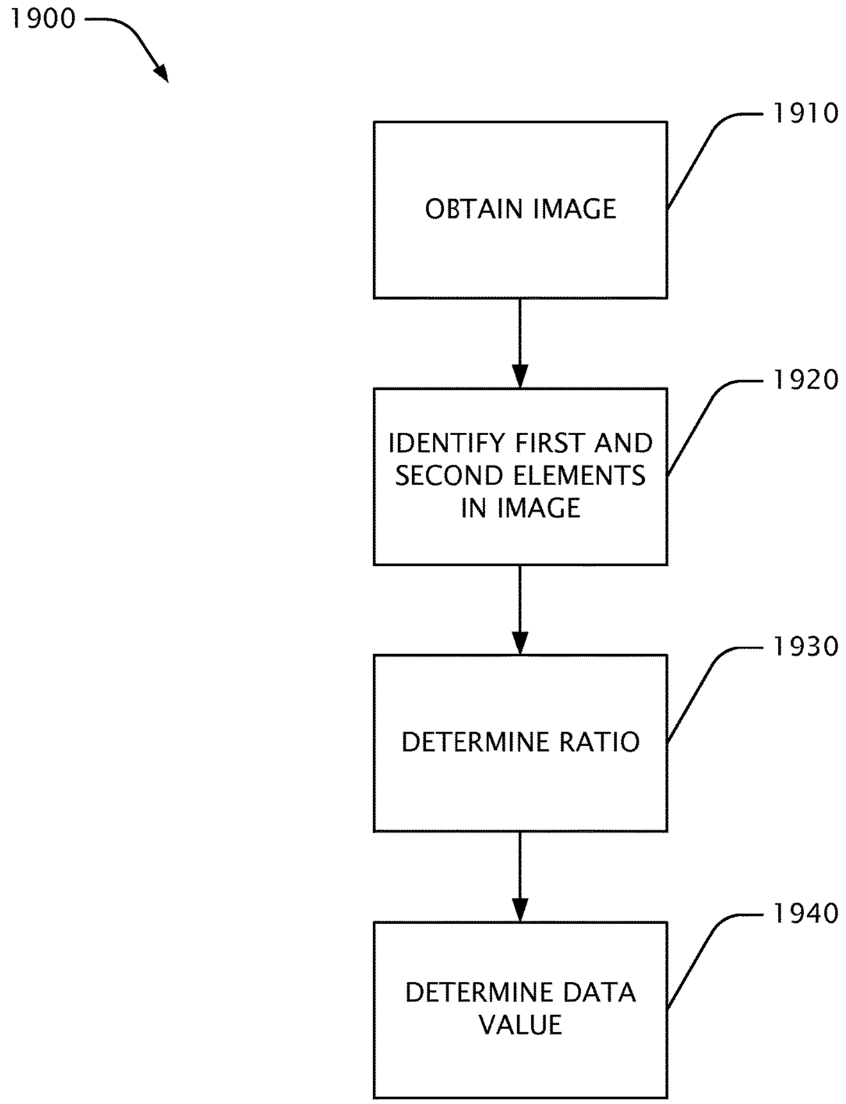
FIG. 16 shows an exemplary embodiment of a method for decoding an optical code.

FIG. 16 shows an exemplary embodiment of a method 1900 for decoding an optical code. In a method act 1910, an optical reader obtains an image using an image sensor. Usually, the image is at least a portion of a picture shown on the display of a portable electronic device. However, in some embodiments, the picture is on a piece of paper or other non-electronic surface. The picture comprises an embodiment of any of the optical codes disclosed herein. As such, the resulting image contains at least one encoding region, and possibly multiple encoding regions. A given encoding region can be comprised o multiple, non-adjacent, smaller areas. In some embodiments, each of the encoding regions contains at least first and second elements, the ratio between the elements representing a common, encoded data value. In other cases, the presence of particular elements (e.g., elements of a certain color or pattern) indicates the encoded data.

In a method act 1920, the optical reader identifies the first and second elements in the image. This can be done using any computer-vision algorithm, for example, algorithms from a computer-vision library such as Open CV.

In some embodiments, the reader identifies the largest area or areas of each color in the image, possibly using a function from a computer-vision library. This technique can be used with, for example, the multi-colored grid of FIG. 13. Once the area of each color is determined, then a ratio of the areas of each color is determined. Based on the ratio, an encoded value is determined (e.g., using a lookup table). An example of pseudocode for such an embodiment (using colors) appears below:

```
a=find_area (color=red)
b=find_area (color=green)
b=find_area (color=blue)
r=evaluate_ratio (a, b, c)
encoded13 value=decode (r)
```

Another example of pseudocode for such an embodiment (using shapes) appears below:

```
Num_shape_1=count (findshape (cross))
```

Num_shape_2=count (findshape (square))

r=evaluate_ratio (Num_shape_1, Num_shape_2)

encoded_value=decode (r)

In further embodiments, the reader identifies particular patterns or shapes in the optical code. Based on which patterns or shapes are present in the code, the reader determines an encoded value. An example of pseudocode for such an embodiment (using patterns) appears below:

a=find_pattern (dots)

b=find_pattern (lines)

c=find_pattern (crosshatch)

encoded_value=decode (istrue (a), istrue (b), istrue (c))

In embodiments that use a ratio between image elements, in a method act 1930 the ratio of the first and second elements of the image is determined. The ratio can be based on (1) the respective numbers of the first and second elements, or it can be based on (2) the sizes of the respective surface areas occupied by those elements in the image, or it can be based on a mixture of (1) and (2). In embodiments that do not use a ratio, this method act is omitted.

In a method act 1940, the optical reader determines the encoded data value based on the determined ratio or the determined elements. This can be done using, for example, a data structure that indicates which data values correspond to which ratios or to which pairs of elements. An example of this is Table 1, above. In some embodiments, the determined data value is passed on to another component or system, such as an access control system.

Although the method acts of the method 1900 are described as being performed by the optical reader, at least some of the method acts can be performed by a computer-based control unit, instead.

Figure 17:
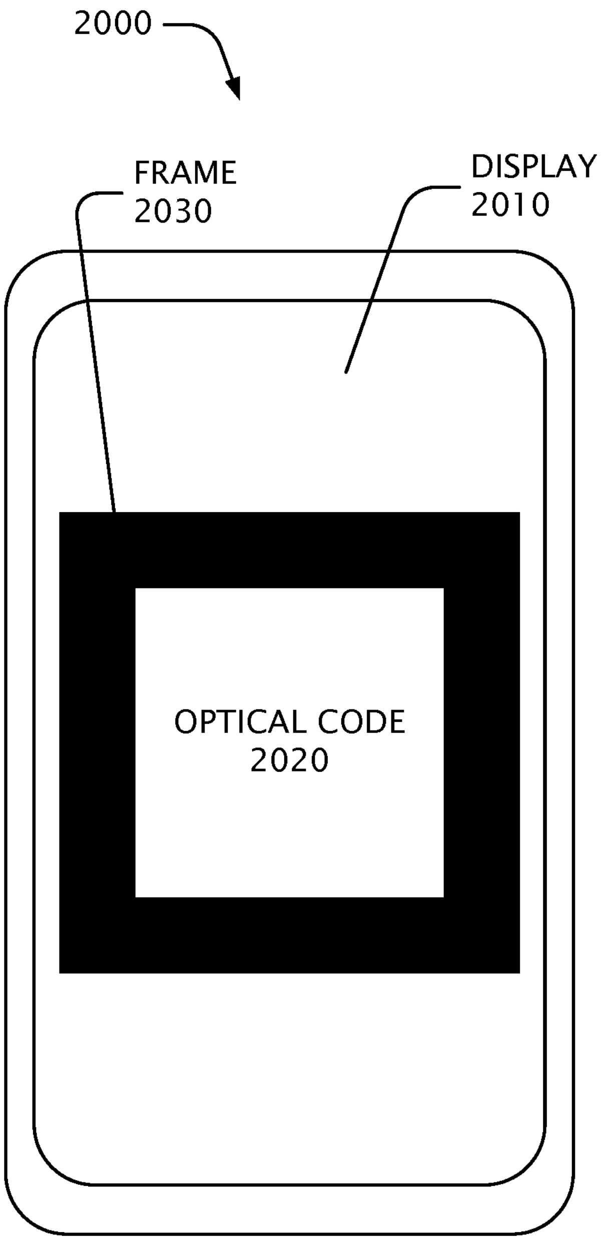
FIG. 17 shows an exemplary embodiment of a portable electronic device with an optical code.

FIG. 17 shows an exemplary embodiment of a portable electronic device 2000, which comprises a display 2010. In this embodiment, the optical code 2020 is shown on the display 2010 surrounded by a frame 2030. The frame 2030 helps show the boundaries of the code 2020 so that the optical reader is less likely to interpret objects outside of the code 2020 as being part of the code. In FIG. 17, the frame 2030 is a thick, black line, but in various embodiments. the frame 2030 can have other forms and colors.

In particular embodiments, the optical reader reads a series of multiple optical codes. The reader can view these codes on the display of, for example, a smartphone or other device, or on a non-electronic surface, such as a piece of paper. The codes are shown one after another, similar to the format of a motion picture of a slide show. The codes can be shown in a look to allow the reader multiple opportunities to recognize them. Using multiple codes can increase the amount of information that the optical reader reads from the device. In some embodiments, one of the optical codes serves as parity information (e.g., as a parity bit, or as a parity image). In additional embodiments, one of the codes indicates the start of the series of codes.

In some cases, when the portable electronic device displays a sequence of optical codes, readability of the individual codes can be improved by displaying a "neutral" frame between each code. The neutral frame is an image that primarily serves to indicate a transition between optical codes. For example, the neutral frame can be a solid-color frame, such as black, gray, white, or another color. Additionally, the codes can be shown at a higher speed than a frame rate of the optical reader. For example, the codes can be shown at about twice the frame rate of the optical reader (e.g., the reader has a frame rate of about 30 fps, and the images are shown at about 60 fps). This can avoid problems that arise when the display of the electronic device and the image sensor of the optical reader are not synchronized.

A portable electronic device can display an optical code using various software programs, for example: a web browser; a media viewer (e.g., for graphics, for films, or both); a dedicated application; or another program. In at lest some of the disclosed embodiments, the features of an optical code are large enough to be discerned by the human eye.

In any of the disclosed embodiments, a fill pattern can include numbers, letters, or other characters. In further embodiments, an image for forming an optical code comprises one or more bars (straight bars, wavy bars, gradient bars) that extend across at least part of the image.

Generally, the disclosed embodiments allow an optical reader to read information from an optical code, even if a portion of the code is unreadable or unavailable. Thus, the robustness of the optical reader is improved.

At least some of the disclosed embodiments provide optical codes that can be read more quickly than other optical codes (e.g., QR codes). Also, any of the disclosed optical codes can be read when a portion of the code is not visible to the optical reader.

Generally, the disclosed embodiments allow an optical code to be read while the code is moving relative to the optical reader, which makes the code-reading process more robust. For example, the code can be read while it is moving towards or away form the reader. As another example, the code can be read while it is being rotated relative to the reader, or while being held at an angle relative to the reader. These aspects can improve readability in situations where a user does not hold the optical code still during reading (e.g., if the user is physically unable to do so because of age of handicap).

Further embodiments do not require an image sensor to be focused on the surface that is displaying the optical code. Thus, the image sensor does not need to be able to perform focusing. If the sensor can perform focusing, then the sensor will still be able to adequately read the code before focusing occurs. This can allow the code to be read more quickly, especially if the surface that is displaying the code is moving during reading.

The disclosed embodiments can generally be used with any optical code application. One example application is access control. In that example application, a guest can receive an optical code from a host, the optical code having been sent at the request of the host. In some cases, a fee is charged for the request. The guest's smartphone can receive the optical code, possibly over a wireless network. The optical code can comprise a single image or a time-varying sequence of multiple images (e.g., a film). When the guest approaches the security gate at the host's building, the guest uses the smartphone to display the optical code, and the guest presents the smartphone to an optical reader. The reader reads the code from the phone and transmits the code to an access control system. In response, the access control system transmits a verification code, for example, also in the form of an optical code, to the smartphone. The guest then has to present the smartphone, which now displays the verification code, again to the optical reader. If that occurs while the verification code is valid, the access control system allows the guest to enter the building.

Although certain data are described herein as being stored in a table or in another data structure, generally such data can be stored in any suitable type of data structure; a structure storing the data can be generated using an algorithm.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

Although many of the disclosed access system embodiments are generally described as controlling access to a physical area, any of the embodiments can be adapted to control access to information (e.g., information stored on a computer).

Unless stated otherwise, a phrase referring to "at least one of" a list of items refers to any combination of those items, including single members. As an example, "at least one of: a, b, or c" is intended to cover: a; b; c; a and b; a and c; b and c; and a, b and c. As another example, "at least one of: a, b, and c" is intended to cover: a; b; c; a and b; a and c; b and c; and a, b and c.

As used herein, a "user" can be a person, a group of persons, a machine, an object, or an animal.

What is claimed is:

1. A system, comprising: a sensor;

an access terminal;

a wireless communication network;

a database; and a computer-based control unit coupled to the sensor, the access terminal, the wireless communication network, and the database, the control unit comprising a processor and a computer-readable storage medium, the computer-readable storage medium comprising instructions that cause the processor to:

provide an access code to a first user, the access code being subsequently provided to a second user;

receive an activation signal from the second user indicative of the second user's activation of the access code;

as a result of receiving the activation signal, send a verification code to a portable electronic device of the first user;

receive the verification code at an access terminal; and grant access to the predetermined service or area if the reception of the verification code at the access terminal meets one of several predetermined conditions.

2. The system of claim 1, wherein said predetermined condition requires that the access terminal receives the verification code within a limited validity time, wherein the activation signal is generated by the access terminal in response to the second user presenting the access code to the access terminal.

3. The system of claim 2, wherein the validity time is based on an expected time for providing the verification code to the access terminal after receipt by the portable electronic device.

4. The system of claim 2, wherein the validity time is based on an expected time for providing the verification code to the access terminal after receipt by the portable electronic device.

5. The system of claim 1, wherein said predetermined condition requires that the access terminal receives the verification code without having been involved in generating the activation signal.

6. The system of claim 5, wherein said predetermined condition further requires that the access terminal receives the verification code after another access terminal was involved in generating the activation signal in response to the second user presenting the access code.

7. The system of claim 1, wherein at least one of the access code and the verification code is displayed on the portable electronic device as an optical code.

8. The system of claim 1, further comprising generating the activation signal in response to the second user presenting the access code to the access terminal.

9. The system of claim 1, further comprising sending the access code to the portable electronic device based on a device identifier for the portable electronic device.

10. A method of controlling access to a predetermined service or area, comprising:

providing an access code to a first user, the access code being subsequently provided to a second user;

receiving an activation signal from the second user indicative of the second user's activation of the access code;

as a result of receiving the activation signal, sending a verification code to a portable electronic device of the first user;

receiving the verification code at an access terminal; and granting access to the predetermined service or area if the reception of the verification code at the access terminal meets one of several predetermined conditions.

11. The method of claim 10, wherein the verification code is provided to the second user by the first user such that the second user is able to provide the verification code to the access terminal.

12. The method of claim 11, wherein one of the predetermined conditions is that the verification code is received by the access terminal within a predetermined time from when the verification code is sent to the first user.

13. The method of claim 10, wherein said one of several predetermined conditions relates to an allowed number of uses of the access code.

* * * * *